(12) United States Patent
Bradicich et al.

(10) Patent No.: US 8,091,127 B2
(45) Date of Patent: Jan. 3, 2012

(54) HEURISTIC MALWARE DETECTION

(75) Inventors: Thomas M. Bradicich, Apex, NC (US); Richard E. Harper, Chapel Hill, NC (US); William J. Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 1147 days.

(21) Appl. No.: 11/609,170

(22) Filed: Dec. 11, 2006

(65) Prior Publication Data

US 2008/0141371 A1 Jun. 12, 2008

(51) Int. Cl.
*G06F 11/00* (2006.01)
(52) U.S. Cl. ........... 726/22; 726/23; 726/24; 726/25; 726/26; 717/121; 717/145; 717/164
(58) Field of Classification Search ............ 726/22–26; 709/223–224; 717/121, 145, 164
See application file for complete search history.

(56) References Cited

U.S. PATENT DOCUMENTS

| | | |
|---|---|---|
| 6,952,776 B1 | 10/2005 | Chess |
| 7,577,946 B2 * | 8/2009 | Murakami et al. ........... 717/145 |
| 2003/0131256 A1 | 7/2003 | Ackroyd |
| 2004/0024736 A1 | 2/2004 | Sakamoto et al. |
| 2007/0067842 A1 * | 3/2007 | Greene et al. ............ 726/24 |

FOREIGN PATENT DOCUMENTS

| | | |
|---|---|---|
| EP | 1549012 A1 | 6/2005 |
| WO | 03021402 A2 | 3/2003 |

OTHER PUBLICATIONS

Arnold, W.C.; System for Detecting Undesired Alteration of Software; TDB n11 04-90 p. 48-50.

* cited by examiner

*Primary Examiner* — Thanhnga Truong
(74) *Attorney, Agent, or Firm* — Steven M. Greenberg, Esq.; Carey, Rodriguez, Greenberg & O'Keefe

(57) ABSTRACT

Embodiments of the present invention provide a method, system and computer program product for the heuristic malware detection. In one embodiment of the invention, a heuristic malware detection method can include merging a baseline inventory of file attributes for respective files from each client computing system in a community of client computing systems into a merged inventory. The method further can include receiving an updated inventory of file attributes in a current inventory survey from different ones of the client computing systems. Each received survey can be compared to the merged inventory, and in response to the comparison, a deviant pattern of file attribute changes can be detected in at least one survey for a corresponding client computing system. Thereafter, the deviant pattern can be classified as one of a benign event or a malware attack. Finally, malware removal can be requested in the corresponding client computing system if the deviant pattern is classified as a malware attack.

25 Claims, 3 Drawing Sheets

HEURISTIC MALWARE DETECTION

BACKGROUND OF THE INVENTION

1. Field of the Invention

The present invention relates to the field of network security, and more particularly to malware detection in a computing environment.

2. Description of the Related Art

The Internet has transformed society in many ways. From business use to consumer use, the ability to transfer information between computers has enabled new methods of commerce such as on-line banking and on-line purchasing. The Internet has had profound effects on business processes in many industries. As business functionality has matured, so have operational processes to handle the increasingly complex issues of reliability, privacy and security.

Today, computer users and businesses face a new and growing threat to security and privacy on the Internet. This threat is not only in the form of direct attacks by viruses, but also by indirect access in the form of monitoring programs installed on computers referred to as "malware". Spyware, a malware species, serves to surreptitiously monitor and report computer user activities to third parties. Although the consequences of spyware may be as minor as annoying advertising pop-ups, spyware has the potential to impart significant damage to a machine and also to an entire network. Spyware-type malware has the ability to capture virtually every online activity. From monitoring all keystrokes, to email snooping, to scanning files on a user's hard drive, to changing system or registry settings, spyware is an immense personal and enterprise security threat. Such activities can lead to identity theft, data corruption, and even theft of company trade secrets.

The traditional approach to detecting malware such as spyware and also computer viruses typically require a database of known signatures that describe malicious content. This database periodically must be pushed to or pulled from client computing systems, where the malware scans usually occur. Current anti-spyware tools operate in a way similar to traditional anti-virus tools, where signatures associated with known spyware programs are checked against newly-installed applications.

The time delays introduced by recognizing an attack, extracting a signature, updating virus definition files and databases, distributing them, scheduling malware scans, and reporting results to a centralized malware management authority result in a less-than-optimal effective response to new malware attacks. Also, attempts by users and enterprises to protect machines from such attacks by using anti-virus programs and firewalls have resulted with a mixed record of success at best.

Unfortunately, these techniques are very easy to evade by using simple obfuscation transformations. One of the main problems with these solutions is that they are dependent on a known repository of malware, failing to provide early detection and containment of the spread of malware. In addition, current techniques to combat malware mostly rely on manual configurations and human intervention, and may fail to react in time to defend against an attack.

BRIEF SUMMARY OF THE INVENTION

Embodiments of the present invention address deficiencies of the art in respect to network security and provide a novel and non-obvious method, system and computer program product for the detection and preventative treatment of malware in a communications network. In one embodiment of the invention, a heuristic malware detection method can be provided. The method can include merging a baseline inventory of file attributes for respective files from each client computing system in a community of client computing systems into a merged inventory for the community. The method further can include receiving an updated inventory of file attributes in a current inventory survey from different ones of the client computing systems in the community.

Each received current inventory survey can be compared to the merged inventory, and in response to the comparison, a deviant pattern of file attribute changes can be detected in at least one current inventory survey for a corresponding client computing system in the community. Thereafter, the deviant pattern can be classified as one of a benign event or a malware attack. For instance, the deviant pattern can be classified as one of a benign event or a malware attack by distinguishing potential malware from a routine software upgrade. Finally, malware removal can be requested in the corresponding client computing system if the deviant pattern is classified as a malware attack.

In another embodiment of the invention, a malware detection data processing system can be provided. The system can include a remote malware detection authority and a community of client computing systems each communicatively coupled to the malware detection authority over a computer communications network. The remote malware detection authority can include a periodically updated merged inventory of file attributes for corresponding files in the client computing systems system. The remote malware detection authority further can include deviant pattern detection logic. The logic can include program code enabled to compare received current inventory surveys from different ones of the client computing systems to the merged inventory and to classify deviant patterns of changes in the received current inventory surveys as either acceptable changes or a malware attack.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for heuristic malware detection in a community of client computing systems. In the present invention, a baseline inventory of file attributes can be acquired for respective files from different client computing systems in the community. The file attributes, for instance can include file size, file time and date stamp, file path, and file signature, and can be merged for each client computing system into a merged inventory in a malware detection authority. Thereafter, the different client computing systems periodically can update their respective inventories seeking inventory changes and an updated client inventory survey can be provided to the malware detection authority for each of the different client computing systems.

Inventory changes in each updated client inventory survey can be compared to the merged inventory to detect deviant patterns in the changes. In response to detecting a deviant pattern, the pattern can be classified as either benign, or a malware attack. In this regard, it is to be recognized that some deviant patterns will indicate benign events such as software upgrades and not malware. Once a deviant pattern has been classified as a malware attack for an offending client computing system, malware removal logic can be invoked in the offending client computing system. Additionally, data regarding the newly classified malware attack can be provided to a central malware authority for the benefit of the global community.

Figure 1:
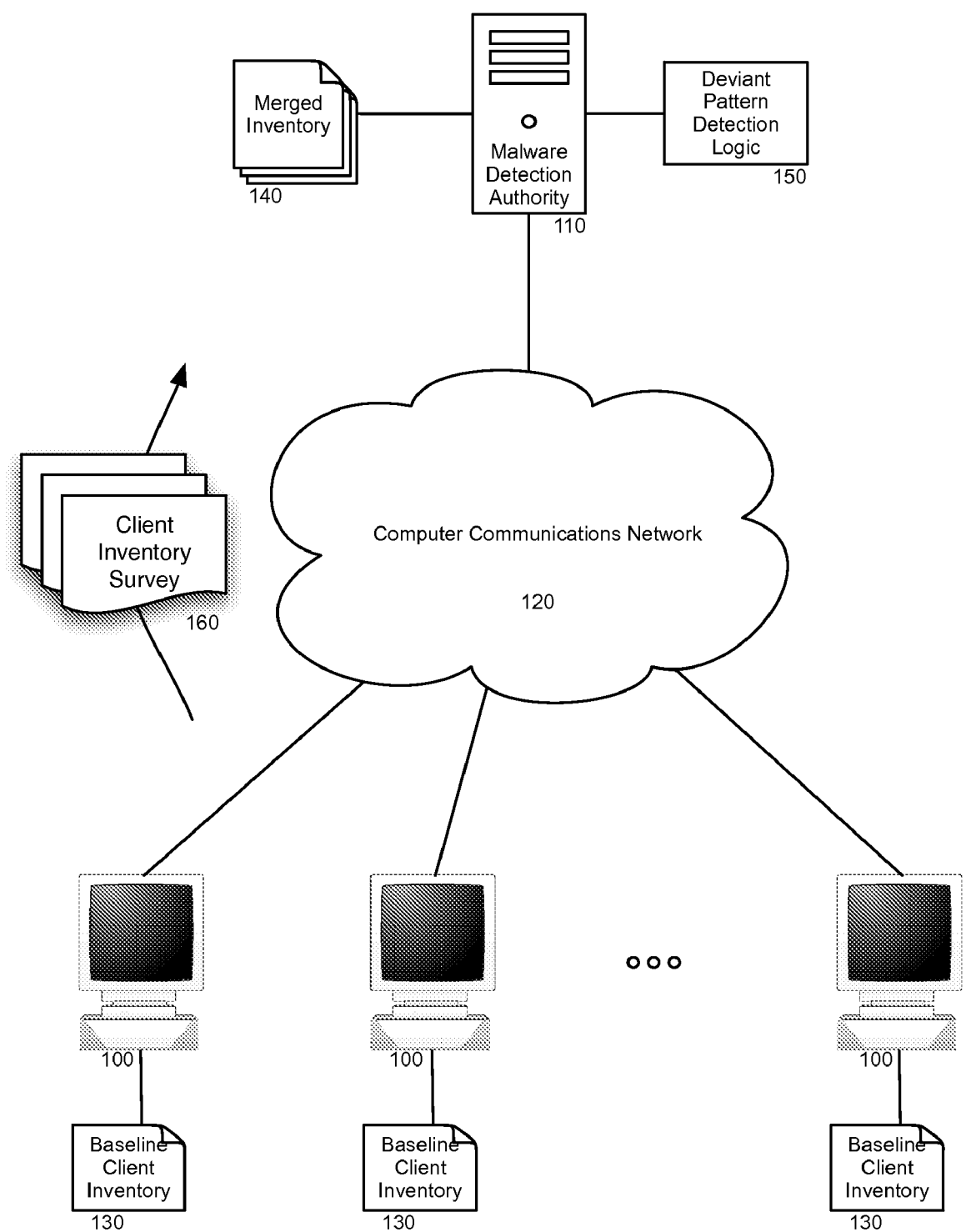
FIG. 1 is a schematic illustration of a heuristic malware detection data processing system.

In illustration, FIG. 1 is a schematic illustration of a malware detection data processing system configured for deviant pattern identification for malware detection. The system can include multiple different client computing systems 100 in a community of client computing systems. A malware detection authority 110 can be provided along with deviant pattern detection logic 150 and the authority 110 can be communicatively coupled to each of the client computing systems 100 over a computer communications network 120. The malware detection authority 110 further can include a merged inventory 140. The merged inventory 140 can include an aggregation of file attributes for individual collections of files for each of the client computing systems 100 in the community of client computing systems.

Each client computing system 100 in the community of client computing systems can be configured to collect file attributes for a set of files disposed in the client computing system 100. The file attributes can include file sizes, file time and data stamps, and file paths, for example. Each client computing system also can be configured to provide the collection of file attributes to the malware detection authority as a baseline client inventory 130. As such, the malware detection authority 110 can be configured to aggregate each baseline client inventory 130 into a merged inventory 140 so as to reflect a prevailing trend of attributes for corresponding files disposed in different ones of the client computing systems 100.

The deviant pattern detection logic 150 can include program code enabled to detect deviant patterns in subsequently surveyed client inventories 160. Specifically, the deviant patterns can include attributes in the surveyed client inventories 160 for specific files that differ to some degree from the attributes in the merged inventory 140. The logic can classify each deviant pattern as indicative of the presence of malware where the deviation exceeds an established threshold, or the deviant pattern can be classified as a mere anomaly reflecting changing environmental conditions. In the case of a malware classification, malware removal and remediation can be requested for the client computing systems 100 in the offending client computing systems demonstrating the deviant pattern.

Figure 2:
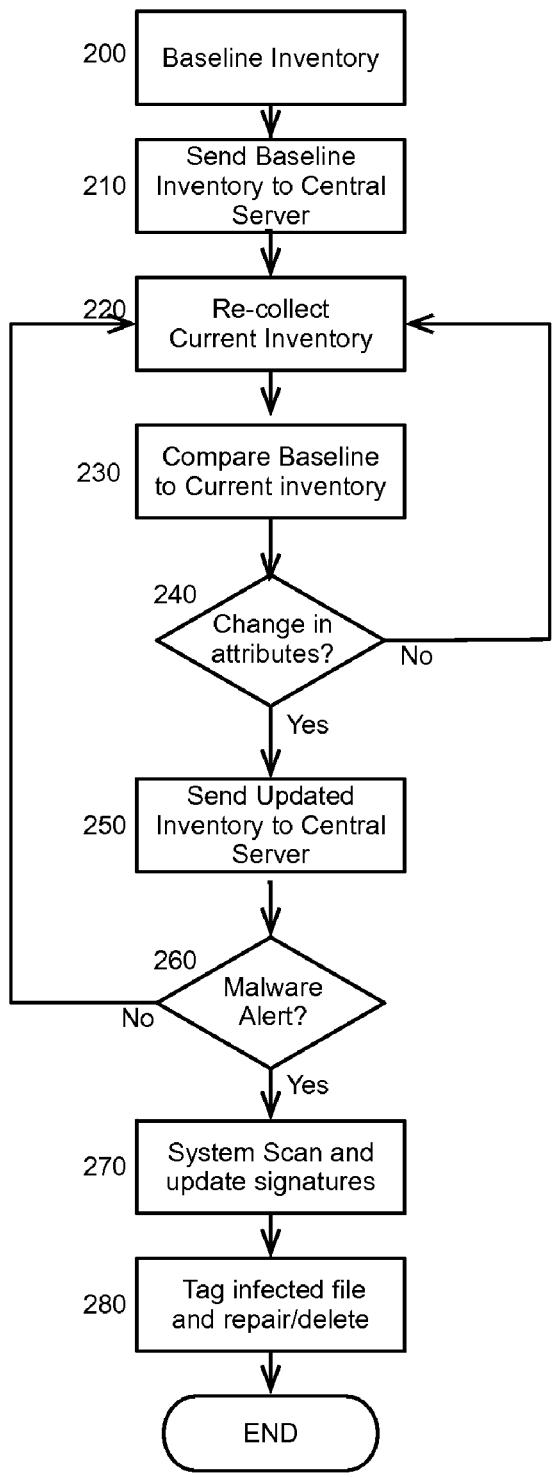
FIG. 2 is a client-side heuristic malware detection process for use in coordination with the system of FIG. 1; and, FIG. 3 is a flow chart illustrating a server-side heuristic malware detection process for use in coordination with the system of FIG. 1.

In further illustration, FIG. 2 is a flow chart illustrating a client-side process for malware detection in the system of FIG. 1. Beginning in block 200, a baseline inventory of file attributes for files and folders on the client system can be acquired. The baseline inventory can include file attributes such as the path to the item, the size of the item, the date and time stamp of the item, and the signature of the entire item. Moreover, the signature can include, for example, a cyclic redundancy checksum (CRC) computed from the contents of the item, or the signature can include a more cryptographically secure signature.

In block 210, a copy of the baseline client inventory can be sent to a remote malware detection authority where the baseline inventory can be merged and compared with similar baseline inventories received from other client systems. Thereafter, in block 220 the client system can re-collect a current inventory of all file attributes in a client inventory survey. Notably, in a large community of client computing systems, each client computing system can periodically or continuously as a low priority background task scan all files by collecting the file attributes repeatedly for the client system in order to create a multiplicity of client inventory surveys throughout the community.

In block 230, the collected current inventory survey can be compared with the baseline inventory and, in decision block 240, if there is no change in attributes, the process can return to block 220 where a new current inventory survey can be collected. Otherwise, in decision block 240, if there is a change in any attributes after the comparison, then in block in block 250 the current inventory survey can be forwarded to the remote malware detection authority where deviant pattern detection logic can confirm whether or not a malware attack may be present in the client system.

In decision block 260, it can be determined whether a malware alert has been received from the remote malware detection authority in response to the client having uploaded the current inventory survey. If not, the process can return to block 220 where a new current inventory survey can be collected. However, if an alert is received from the remote malware detection authority, in block 270 malware removal logic can initiate a malware scan and updated signatures for malware further can be applied to the malware removal logic in the client computing system. Finally, in block 280, any infected files located can be tagged for repair or deletion.

It will be recognized by the skilled artisan that by notifying the remote malware authority only upon detecting changes in attributes during a current inventory survey, substantial processing resources can be conserved in the remote malware authority. Notwithstanding, long absences of a notification from the client can be interpreted by the remote malware authority as the consequence of a malware infection. To that end, in one aspect of the embodiment, a summary inventory can be provided by the client to the remote malware authority on a periodic basis irrespective of the detection of any attribute changes in a current inventory. The summary can include file dates, times, names, CRC or checksums, and the like. Using the summary data, the remote malware authority itself can compare older summaries to detect attribute changes in order to trigger an alert.

The failure of the client to report to the remote malware authority can be viewed as an indication of a malware infection. Still, as additional processing resources will be consumed in the remote malware authority processing of the summary on a periodic basis, as an alternative, the client can forward an "all clear signal" whenever a current inventory summary produces no detected attribute changes. Notably, in accordance with the present invention, the detection of malware can be performed in the remote malware authority based upon deviant patterns for file attributes collected for numerous client computing systems in a community of client computing systems.

Figure 3:
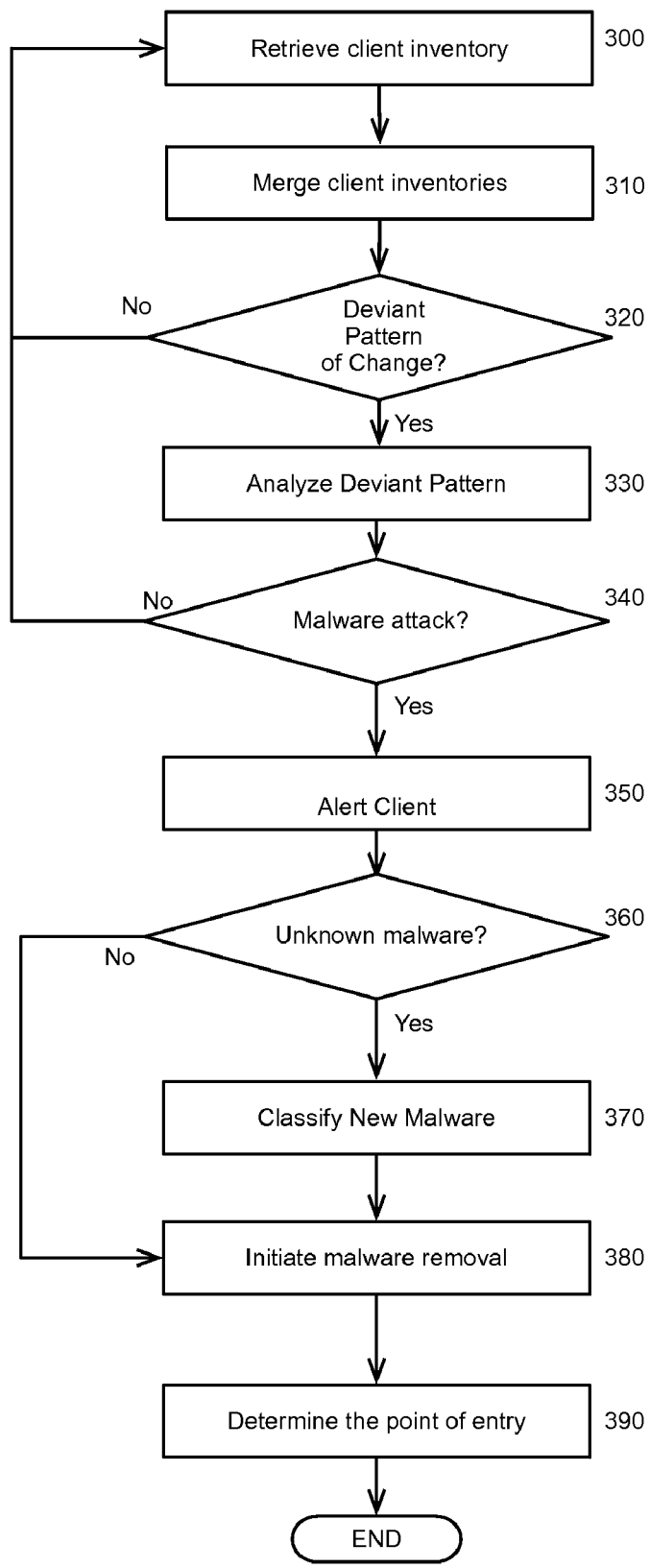

Specifically, as shown in FIG. 3, beginning in block 300 current inventory survey can be received from a client computing system in the community. The survey can include file attributes for files and folders in the client computing system.

In block 310, the received current inventory survey can be merged into the existing merged inventory of aggregate file attributes for all client computing systems in the community. In decision block 320, it can be determined if a deviant pattern of change exists between the merged inventory and the current inventory survey for the client computing system. If so, in block 330 an abnormal pattern analysis can be performed.

The abnormal pattern analysis can determine whether there is an abnormal or benign change in the file attributes for the client computing system as compared to the merged inventory for the community. For example, to distinguish malware from a routine software upgrade, an administrator can install applications on a "sandbox" system and store the sandbox attributes inventory into the malware detection authority as a "benign" client computing system. Thus, any other client computing system reporting similar attributes to those of the sandbox system can be judged as acceptable in the abnormal pattern analysis. In contrast, other client computing system reporting dissimilar attributes to those of the sandbox system can be judged as suspect.

In any event, in block 330, the abnormal pattern analysis can identify whether the disparity reflected in the deviant pattern of change is potential malware. For example, if the deviant pattern change reflects a different signature for items with the same name and date/time stamp as those of the merged inventory, then the abnormal pattern analysis can conclude that the disparity is likely to have been caused by a malware attack. In addition, if the deviant pattern reflects a different date/time stamp for a small set of executable files, as compared to not only the date/time stamp on other executable files in the same folder of the client computing system, but also other client computing systems in the community, then the abnormal pattern analysis can determine that the disparity is a sign of a malware attack.

In decision block 340, if it is determined that the deviant pattern of change has been caused by a malware attack, then the malware detection authority can alert the client computing system initiate malware detection in block 350. Thereafter, in decision block 360, if the client computing system reports the detection of known malware, in block 380 the malware can be removed in the client computing system. Otherwise, if in decision block 360, the client computing system reports the detection of unknown malware, then in block 370 the malware detection authority can forward the infected files to a global malware authority such as U.S. Computer Emergency Readiness Team (CERT) to identify, classify, and develop a cure. Finally in block 390, the point of entry for the malware can be determined. For example, the point of entry can be determined through time and space mapping to provide a quicker solution for better containment and prevention of malware attacks.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. In a community of client computing systems, a heuristic malware detection method comprising:

merging in a malware detection authority executing in memory by at least one processor of a computing system, a baseline inventory of file attributes for respective files from each client computing system in the community into a merged inventory for the community;

receiving an updated inventory of file attributes in a current inventory survey from different ones of the client computing systems in the community;

comparing each received current inventory survey to the merged inventory, and responsive to the comparison, detecting a deviant pattern of file attribute changes in at least one current inventory survey for a corresponding client computing system in the community;

classifying the deviant pattern as one of a benign event or a malware attack; and requesting malware removal in the corresponding client computing system if the deviant pattern is classified as a malware attack.

2. The method of claim 1, wherein receiving an updated inventory of file attributes in a current inventory survey from different ones of the client computing systems in the community, comprises periodically receiving an updated inventory of file attributes in a current inventory survey from different ones of the client computing systems in the community.

3. The method of claim 2, further comprising classifying a failure to receive an updated inventory of file attributes in a current inventory survey from a client computing system as a malware attack in the client computing system.

4. The method of claim 2, further comprising continuously merging received updated inventories of file attributes in received current inventory surveys into the merged inventory.

5. The method of claim 1, wherein receiving an updated inventory of file attributes in a current inventory survey from different ones of the client computing systems in the community, further comprises receiving an all clear signal in lieu of a current inventory survey when the current inventory survey indicates no detected attribute changes in a corresponding one of the client computing systems.

6. The method of claim 4, wherein detecting a deviant pattern of file attribute changes in at least one current inventory survey for a corresponding client computing system in the community, comprises detecting a deviation in the current inventory survey from a common pattern of file attribute changes collectively occurring in a threshold number of client computing systems in the community as reflected in the baseline inventory.

7. The method of claim 1, wherein classifying the deviant pattern as one of a benign event or a malware attack comprises distinguishing potential malware from a routine software upgrade.

8. The method of claim 1, further comprising sending notice of unknown malware to a global malware authority to identify and classify the unknown malware attack.

9. The method of claim 1, further comprising initiating malware removal in an offending one of the client computing systems in the community responsive to a request for malware removal received from a remote malware authority.

10. The method of claim 9, wherein initiating malware removal, comprises:
   tagging infected files in the offending one of the client computing systems;
   updating a malware removal utility program in the offending one of the client computing systems for the malware attack; and,
   performing one of a repair or a deletion of the infected files.

11. The method of claim 1, further comprising determining the point of entry of the malware attack into the community.

12. The method of claim 11, wherein determining the point of entry comprises time and space mapping the spread of the malware attack through the community of client computing systems.

13. A malware detection data processing system comprising:
   a remote malware detection authority; and,
   a community of client computing systems each communicatively coupled to the malware detection authority over a computer communications network;
   the remote malware detection authority comprising a continuously updated merged inventory of file attributes for corresponding files in the client computing systems system;
   the remote malware detection authority further comprising deviant pattern detection logic comprising program code enabled to compare received current inventory surveys from different ones of the client computing systems to the merged inventory and to classify deviant patterns of changes in the received current inventory surveys as either acceptable changes or a malware attack.

14. The system of claim 13, wherein each of the client computing systems comprises a malware removal utility.

15. A computer program product comprising a non-transitory computer usable storage medium embodying computer usable program code for heuristic malware detection, the computer program product comprising:
   computer usable program code for merging a baseline inventory of file attributes for respective files from each client computing system in the community into a merged inventory for the community;
   computer usable program code for receiving an updated inventory of file attributes in a current inventory survey from different ones of the client computing systems in the community;
   computer usable program code for comparing each received current inventory survey to the merged inventory, and responsive to the comparison, detecting a deviant pattern of file attribute changes in at least one current inventory survey for a corresponding client computing system in the community;
   computer usable program code for classifying the deviant pattern as one of a benign event or a malware attack; and
   computer usable program code for requesting malware removal in the corresponding client computing system if the deviant pattern is classified as a malware attack.

16. The computer program product of claim 15, wherein the computer usable program code for receiving an updated inventory of file attributes in a current inventory survey from different ones of the client computing systems in the community, comprises computer usable program code for periodically receiving an updated inventory of file attributes in a current inventory survey from different ones of the client computing systems in the community.

17. The computer program product of claim 16, further comprising computer usable program code for classifying a failure to receive an updated inventory of file attributes in a current inventory survery from a client computing system as a malware attack in the client computing system.

18. The computer program product of claim 16, further comprising computer usable program code for continuously merging received updated inventories of file attributes in received current inventory surveys into the merged inventory.

19. The computer program product of claim 15, wherein the computer usable program code for receiving an updated inventory of file attributes in a current inventory survey from different ones of the client computing systems in the community, further comprises computer usable program code for receiving an all clear signal in lieu of a current inventory survey when the current inventory survey indicates no detected attribute changes in a corresponding one of the client computing systems.

20. The computer program product of claim 15, wherein the computer usable program code for detecting a deviant pattern of file attribute changes in at least one current inventory survey for a corresponding client computing system in the community, comprises computer usable program code for detecting a deviation in the current inventory survey from a common pattern of file attribute changes collectively occurring in a threshold number of client computing systems in the community as reflected in the baseline inventory.

21. The computer program product of claim 15, wherein the computer usable program code for classifying the deviant pattern as one of a benign event or a malware attack comprises computer usable program code for distinguishing potential malware from a routine software upgrade.

22. The computer program product of claim 15, further comprising computer usable program code for sending notice of unknown malware to a global malware authority to identify and classify the unknown malware attack.

23. The computer program product of claim 15, further comprising computer usable program code for initiating malware removal in an offending one of the client computing systems in the community responsive to a request for malware removal received from a remote malware authority.

24. The computer program product of claim 15, further comprising computer usable program code for determining the point of entry of the malware attack into the community.

25. The computer program product of claim 24, wherein the computer usable program code for determining the point of entry comprises computer usable program code for time and space mapping the spread of the malware attack through the community of client computing systems.

* * * * *